United States Patent
Tontiwachwuthikul et al.

(10) Patent No.: US 7,910,078 B2
(45) Date of Patent: Mar. 22, 2011

(54) METHOD OF CAPTURING CARBON DIOXIDE FROM GAS STREAMS

(75) Inventors: Paitoon Tontiwachwuthikul, Regina (CA); Andrew G. H. Wee, Regina (CA); Raphael Idem, Regina (CA); Kreangkrai Maneeintr, Regina (CA); Gao-jun Fan, Regina (CA); Amornvadee Veawab, Regina (CA); Amr Henni, Regina (CA); Adisorn Aroonwilas, Regina (CA); Amit Chakma, Waterloo (CA)

(73) Assignee: University of Regina, Regina, Saskatchewan (CA)

(*) Notice: Subject to any disclaimer, the term of this patent is extended or adjusted under 35 U.S.C. 154(b) by 88 days.

(21) Appl. No.: 11/843,958

(22) Filed: Aug. 23, 2007

(65) Prior Publication Data

US 2008/0050296 A1    Feb. 28, 2008

Related U.S. Application Data

(60) Provisional application No. 60/823,313, filed on Aug. 23, 2006, provisional application No. 60/893,926, filed on Mar. 9, 2007.

(51) Int. Cl.
| | |
|---|---|
| *B01D 53/14* | (2006.01) |
| *B01D 53/56* | (2006.01) |
| *B01D 53/04* | (2006.01) |
| *B01D 53/58* | (2006.01) |
| *C01B 17/16* | (2006.01) |
| *C01B 31/20* | (2006.01) |
| *C01C 3/00* | (2006.01) |
| *C07C 215/00* | (2006.01) |
| *C07D 265/32* | (2006.01) |
| *C07D 295/08* | (2006.01) |
| *C07D 295/10* | (2006.01) |
| *C07D 211/02* | (2006.01) |
| *C07D 211/00* | (2006.01) |
| *C07D 295/00* | (2006.01) |

(52) U.S. Cl. ........ 423/228; 423/230; 423/238; 544/170; 546/184; 546/248; 564/503

(58) Field of Classification Search ................ 410/210, 410/226, 228, 229; 423/228, 230, 238; 544/170; 546/248; 564/503

See application file for complete search history.

(56) References Cited

U.S. PATENT DOCUMENTS

| | | | |
|---|---|---|---|
| 3,347,621 A | 10/1967 | Papadopoulos et al. | |
| 4,101,633 A | 7/1978 | Sartori et al. | |
| 4,112,050 A | 9/1978 | Sartori et al. | |
| 4,112,051 A | 9/1978 | Sartori et al. | |
| 4,112,052 A | 9/1978 | Sartori et al. | |
| 4,372,925 A | 2/1983 | Cornelisse | |
| 4,705,673 A * | 11/1987 | Capobianco et al. | 423/226 |
| 5,209,914 A * | 5/1993 | Peytavy et al. | 423/228 |

(Continued)

OTHER PUBLICATIONS

U.S. Appl. No. 60/823,313, filed Aug. 23, 2006, Tontiwachwuthikul et al.

(Continued)

*Primary Examiner* — Jerry Lorengo
*Assistant Examiner* — Jennifer A Smith
(74) *Attorney, Agent, or Firm* — Gowling Lafleur Henderson LLP

(57) ABSTRACT

The present invention relates to a method for removing carbon dioxide ($CO_2$) from a gas stream. Particularly, the present invention relates to a method for removing $CO_2$ from a gas stream by a liquid absorbent having an amino alcohol derived from 4-amino-2-butanol. In comparison to conventional amines, the amino alcohols of the present invention have been found to provide a higher $CO_2$ absorption capacity and a higher cyclic capacity for $CO_2$ removal.

24 Claims, 5 Drawing Sheets

U.S. PATENT DOCUMENTS

| | | | | |
|---|---|---|---|---|
| 5,277,885 | A | * | 1/1994 | Peytavy et al. ............... 423/228 |
| 5,348,714 | A | * | 9/1994 | Peytavy et al. ............... 423/228 |
| 5,366,709 | A | * | 11/1994 | Peytavy et al. ............... 423/228 |
| 5,378,442 | A | | 1/1995 | Fujii et al. |
| 5,609,840 | A | | 3/1997 | Mimura et al. |
| 5,700,437 | A | | 12/1997 | Fujii et al. |
| 5,736,115 | A | | 4/1998 | Iijima et al. |
| 5,750,083 | A | | 5/1998 | Mimura et al. |
| 5,876,488 | A | * | 3/1999 | Birbara et al. ................ 96/111 |
| 6,051,161 | A | | 4/2000 | Suzuki et al. |
| 6,117,404 | A | | 9/2000 | Iijima et al. |
| 6,165,432 | A | | 12/2000 | Rooney |
| 6,500,397 | B1 | | 12/2002 | Yoshida et al. |

OTHER PUBLICATIONS

U.S. Appl. No. 60/893,926, filed Mar. 9, 2007, Tontiwachwuthikul et al.

De Filippis, P. et al., "Modified Polyamines for $CO_2$ Absorption. Production Preparation and Characterization", Ind. Eng. Chem. Res., vol. 39, pp. 1364-1368, 2000.

Lee, J. I. et al., "Equilibrium Between Carbon Dioxide and Aqueous Monoethanolamine Solutions", J. Appl. Chem. Biotechnol., vol. 26, pp. 541-549, 1976.

Rinaldi, G., "Acid Gas Absorption by Means of Aqueous Solutions of Regenerable Phenol-Modified Polyalkylenepolyamines", Ind. Eng. Chem. Res., vol. 36, pp. 3778-3782, 1997.

STN Search in Registry™ database Feb. 8, 2007.

STN Search in Registry™ database Apr. 18, 2007.

Chakma, A., Separation of Acid Gases from Power Plant Flue Gas Streams by Formulated Amines:, Separation Technology, vol. 11, pp. 727-737, 1994.

Chakma, A., "Formulated Solvents: New Opportunities for Energy Efficient Separation of Acid Gases", Energy Sources, vol. 21, pp. 51-62, 1999.

* cited by examiner

METHOD OF CAPTURING CARBON DIOXIDE FROM GAS STREAMS

CROSS-REFERENCE TO RELATED APPLICATIONS

The present application claims the benefit under 35 USC §119(e) to U.S. provisional patent applications Nos. 60/823,313 and 60/893,926 filed on Aug. 23, 2006 and Mar. 9, 2007, respectively, the contents of which are incorporated by reference in their entirety.

FIELD OF THE INVENTION

The present invention relates to a method for capturing or removing carbon dioxide from a gas stream. Particularly, the present invention relates to a method for removing carbon dioxide from a gas stream by an amine-containing liquid absorbent.

BACKGROUND OF THE INVENTION

The production and use of fossil fuels contribute to an increase in emissions of greenhouse gases (GHGs), especially carbon dioxide ($CO_2$) and other pollutants such as oxides of sulfur ($SO_x$) and oxides of nitrogen ($NO_x$). In Canada, $CO_2$ constitutes the largest fraction of greenhouse gas emissions, accounting for about 80% of the total greenhouse gases emitted. Besides its greenhouse effects, $CO_2$ is also blamed for climate changes and global warming. Through ratification of the Kyoto protocol, Canada is committed to cap greenhouse gas emissions by 6% below the 1990 level. To achieve this target, there needs to be a reduction of about 39% of greenhouse gas emissions from the projected levels by 2010 or about 240 million tonnes of $CO_2$. As a result, large point sources of $CO_2$ emissions such as coal-fired power plants, refineries, cement manufacturers and the like need to be monitored and stringently regulated.

Although captured $CO_2$ can be used in a wide variety of industrial applications, such as in the enhanced oil recovery processes, in which recovered $CO_2$ can be used to produce more oil from petroleum reservoirs while part of the $CO_2$ is simultaneously sequestered in the reservoir, as well as in the manufacturing of commodity chemicals, in which recovered $CO_2$ can be used as a potential chemical feedstock, the process of capturing $CO_2$ efficiently from gas streams is difficult to perform. Thus, intensive research efforts have been made in recent years to develop methods for recovering the $CO_2$ emitted from industrial gas streams and for storing the recovered $CO_2$ without discharging it into the atmosphere.

Conventionally, to reach a desired target for $CO_2$ capture, aqueous alkanolamine solutions have been used to absorb $CO_2$ from low-pressure streams such as flue gases emitted from power plants. A commonly used alkanolamine is monoethanolamine, MEA. From a structural standpoint, one of the advantages of using alkanolamines is that they contain at least one hydroxyl group, which helps to reduce the vapor pressures of alkanolamines and thus minimize the losses of the product during hot regeneration. Another advantage of using alkanolamines is that the presence of the hydroxyl group increases the solubility of the alkanolamines in aqueous solutions, thus allowing the use of highly concentrated absorbing solutions. Yet another advantage of using alkanolamines is that the presence of the amino group provides the necessary alkalinity to absorb $CO_2$ (Kohl, A. L. and Reisenfeld, F. C., Gas Purification, $4^{th}$ ed., Gulf Publishing Co., Houston, Tex., 1985; Kohl, A. L. and Nielsen, R. B., Gas Purification, $5^{th}$ ed., Gulf Publishing Co., Houston, Tex., 1997). Thus, for over 70 years, alkanolamines have long been the solvent of choice for $CO_2$ removal on a commercial scale. In fact, aqueous alkanolamine solutions are the most widely used solvents for $CO_2$ and $H_2S$ absorption.

For many years, the basic alkanolamine process for $CO_2$ capture has remained unchanged but current demands to reduce energy consumption, decrease solvent losses and improve air and water qualities have resulted in several modifications to upgrade the process. The most important improvement is the introduction of specially formulated solvents. Depending on the process requirements, for example, selective removal of $H_2S$ and/or $CO_2$-bulk removal, several options for alkanolamine-based treating solvents with varying compositions are available.

Recently, some companies have developed proprietary hindered amines for use in removing acid gases from liquid and gas streams. A new class of amines, in particular sterically hindered amines, has thus been introduced as commercially attractive amines. These hindered amines can be either primary such as 2-amino-2-methyl-1-propanol (AMP), or secondary, such as diisopropanolamine (DIPA), and they have been found to require much less energy for regeneration than conventional alkanolamines. Accordingly, these hindered amines are useful as promoters and as components of organic physical solvent/amine systems. Furthermore, they have been found to be useful in selective absorption of $H_2S$ in the presence of $CO_2$ (Sartori, G. and Leder, F., U.S. Pat. No. 4,112,050; Sartori, G. and Leder, F., U.S. Pat. No. 4,112,051; and Sartori, G. and Leder, F., U.S. Pat. No. 4,112,052).

In addition to the sterically hindered amines described above, some companies have developed formulated amines. Generally, formulated amines are broadly defined as amines that have been specifically formulated to perform a specific task, for example, selective separation of $H_2S$ from light hydrocarbons in the presence of $CO_2$, bulk separation of $CO_2$, etc. (Chakma, A., "Separation of Acid Gases from Power Plant Flue Gas Streams by Formulated Amines", Separation Technology, Vol. 11, pp. 727-737, 1994; and Chakma, A., "Formulated Solvents: New Opportunities for Energy Efficient Separation of Acid Gases", Energy Sources, Vol. 21, pp. 51-62, 1999). A formulated amine may consist of a single solvent such as 3-(dimethylamino)-1,2-propanediol (DMAPD) (Iijima, M. and Mitsuoka, S., U.S. Pat. No. 5,736,115) or 2-(diethylamino)-ethanol (DEAE) (Yoshida, K., Mimura, T., Shimojo, S., Karasaki, M., Iijima, M., Seto, T. and Mitsuoka, S., U.S. Pat. No. 6,500,397) or a solvent mixture such as a mixture of modified polyamines with formaldehyde or with formaldehyde and phenol (Rinaldi, G., "Acid Gas Absorption by Means of Aqueous Solutions of Regenerable Phenol-Modified Polyalkylenepolyamines", Ind. Eng. Chem. Res., Vol. 36, pp. 3778-3782, 1997; and Filippis, P. D., Giavarini, C., Maggi, C., Rinaldi, G. and Silla, R., "Modified Polyamines for $CO_2$ absorption. Production, Preparation and Characterization", Ind. Eng. Chem. Res., Vol. 39, pp. 1364-1368, 2000) in aqueous solution. Most of the proprietary solvents marketed by the major solvent manufacturers for $CO_2$ capture are based on formulated amines. By judicious choice of a formulated amine or an amine mixture, the process efficiency of removing acid gases from liquid and gas streams can be enhanced significantly as compared to the use of traditional amines. Furthermore, some of the gas processing problems that cannot be dealt with using the conventional technology in an economical manner can be easily handled with formulated amines.

While it is possible to obtain a cost reduction in $CO_2$ capture using formulated alkanolamines, this route may not necessarily present the most optimum scenario for the process. Further, since the amines which are required for formulation are typically those that are commercially available, the scope for optimization is thereby limiting to existing amines.

There is a need for developing an efficient and cost effective method for capturing or removing $CO_2$ from gas streams.

SUMMARY OF THE INVENTION

It has been found that certain amino 2-butanol compounds are highly effective reagents for removing carbon dioxide ($CO_2$) from gas streams.

Accordingly, the present invention includes a method for removing $CO_2$ from a gas stream comprising contacting the gas stream with a liquid absorbent comprising an amino alcohol of the formula I:

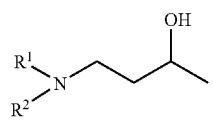

wherein
$R^1$ and $R^2$ are independently selected from H and $C_{1-10}$alkyl, or
$R^1$ and $R^2$ are linked to form a 5 to 12-membered carbocyclic ring system, under conditions for absorption of $CO_2$ by the absorbent and thereby, removal of $CO_2$ from the gas stream.

In an embodiment of the present invention, the amino alcohol of formula I is selected from 4-(diethylamino)-2-butanol; 4-(piperidino)-2-butanol; 4-propylamino-2-butanol, 4-isopropylamino-2-butanol and 4-(ethyl-methyl-amino)-2-butanol.

In a further embodiment the liquid absorbent further comprises a solvent.

The present invention also includes $CO_2$ absorbers, absorption columns and absorption towers comprising a liquid absorbent as defined above.

As shown hereinafter in the experimental examples, the liquid absorbents comprising the amino alcohol of the formula I as defined above provide far superior $CO_2$ absorption and cyclic capacity, including the ease of stripping of $CO_2$ from the absorbent, than the conventionally used amine, monoethanolamine, MEA.

Other features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The invention will now be described in relation to the drawings in which.

DETAILED DESCRIPTION OF THE INVENTION

Figure 1:
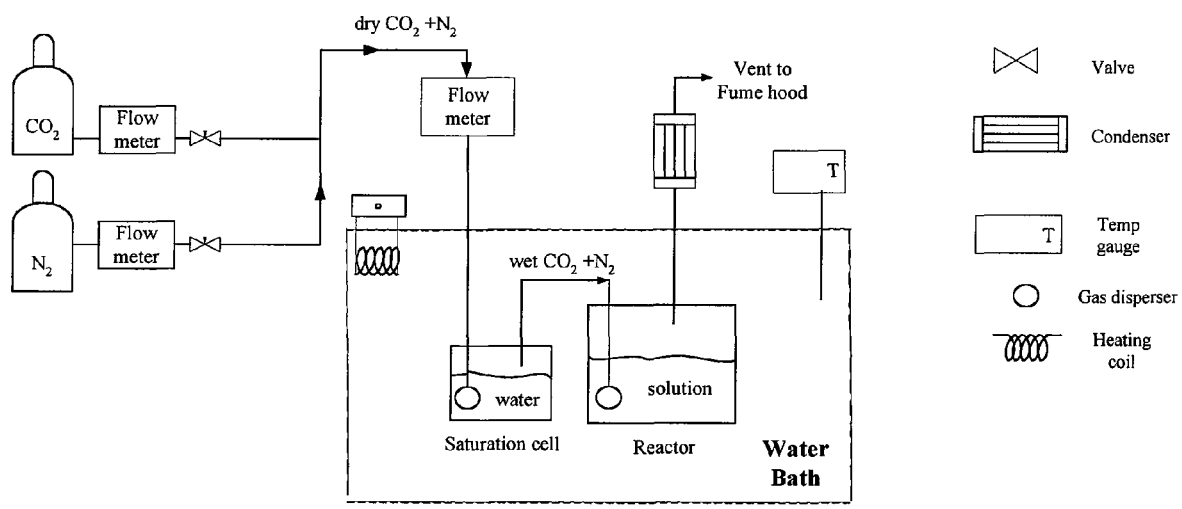
FIG. 1 shows a schematic diagram of the apparatus for evaluating the performance of amino alcohols on $CO_2$ absorption capacity, also referred to as $CO_2$ solubility (Lee, J. I., Otto, F. D. and Mather, A. E., "Equilibrium between Carbon Dioxide and Aqueous Monoethanolamine Solutions", J. Appl. Chem. Biotechnol., Vol. 26, pp. 541-549, 1976).
Figure 2:
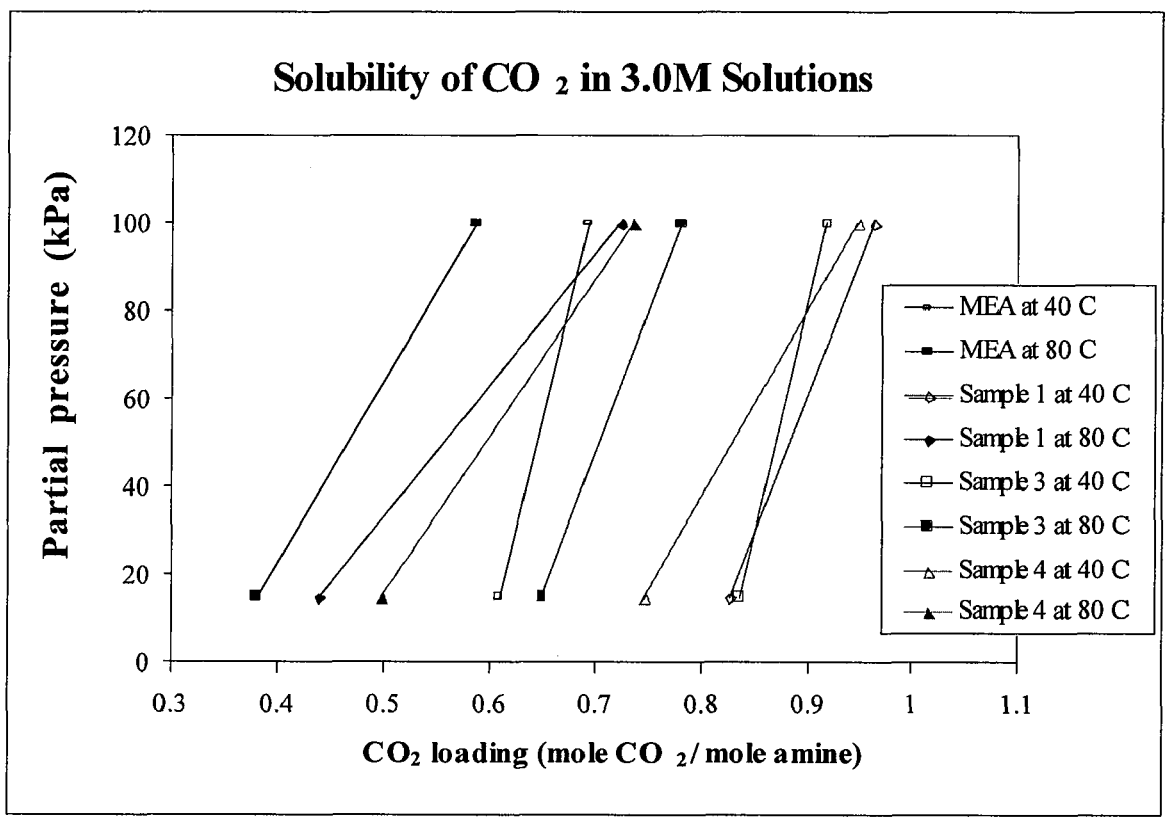
FIG. 2 shows a graph illustrating the solubility of $CO_2$ in MEA, 4-(diethylamino)-2-butanol, 4-isopropylamino-2-butanol and 4-(piperidino)-2-butanol at 40° C. and 80° C.
Figure 3:
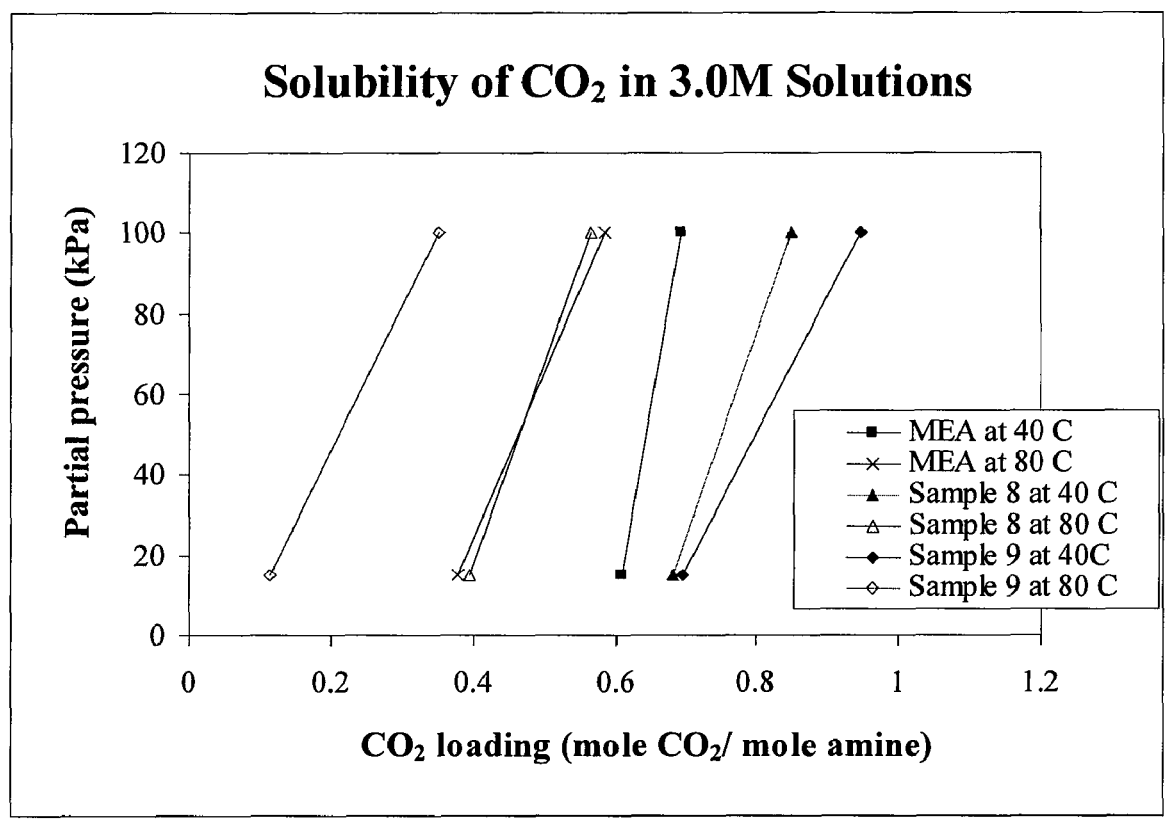
FIG. 3 shows a graph illustrating the solubility of $CO_2$ in MEA, 4-propylamino-2-butanol and 4-(ethyl-methyl-amino)-2-butanol at 40° C. and 80° C.
Figure 4:
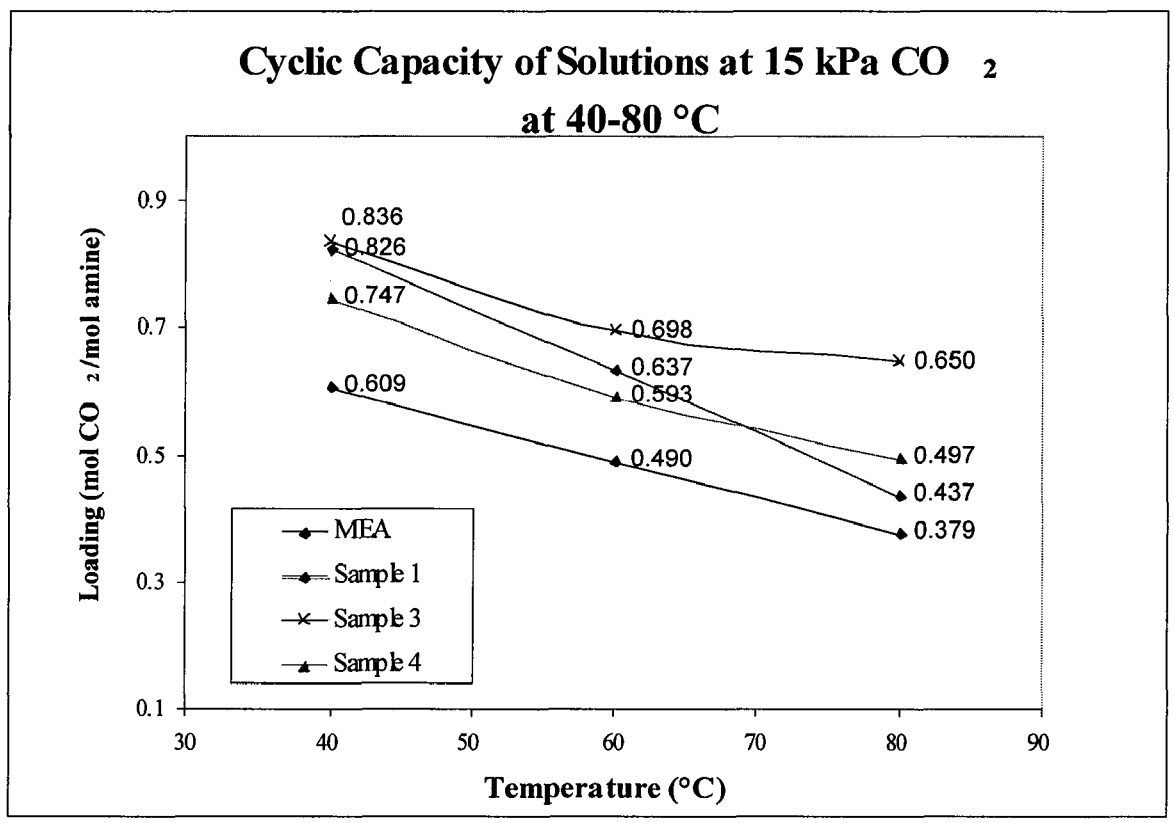
FIG. 4 shows a graph illustrating the cyclic capacity and the effect of temperature on the solubility of $CO_2$ in MEA, 4-(diethylamino)-2-butanol, 4-isopropylamino-2-butanol and 4-(piperidino)-2-butanol at 40° C., 60° C. and 80° C.
Figure 5:
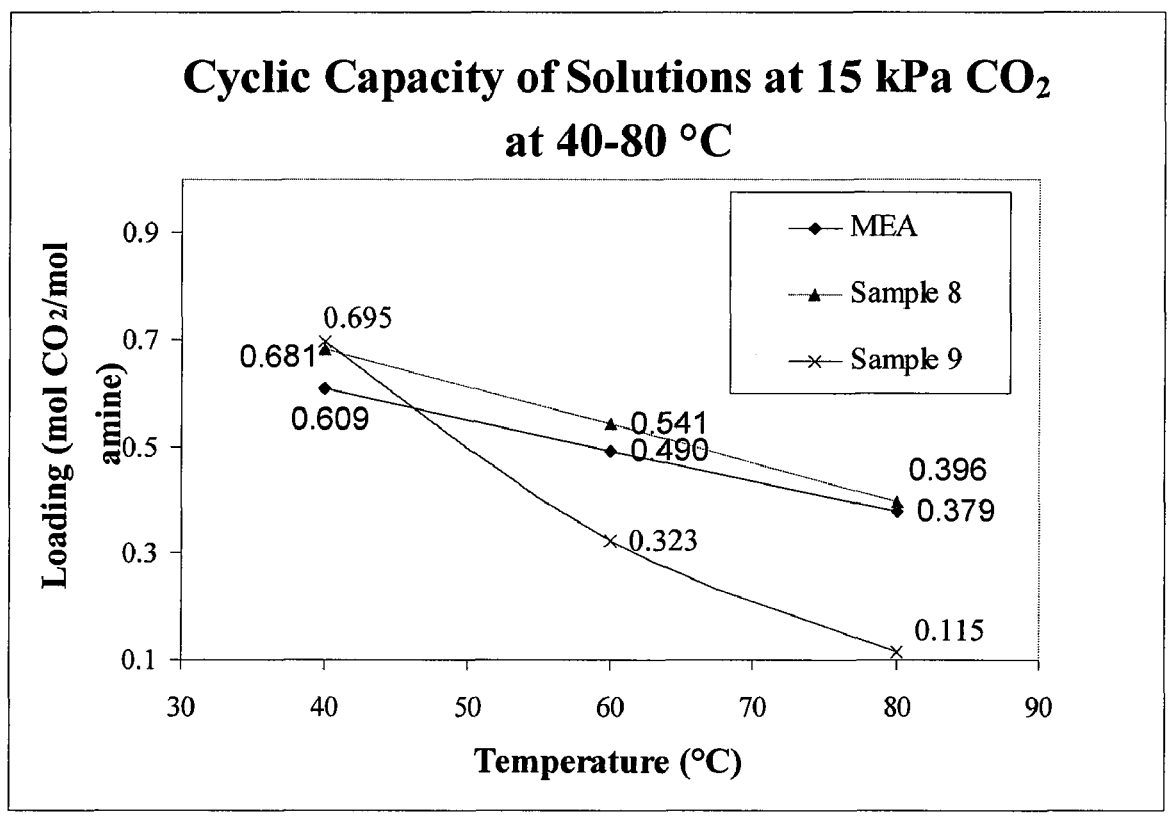
FIG. 5 shows a graph illustrating the cyclic capacity and the effect of temperature on the solubility of $CO_2$ in MEA, 4-propylamino-2-butanol and 4-(ethyl-methyl-amino)-2-butanol at 40° C., 60° C. and 80° C.

It has been demonstrated that by way of rational molecular design and placement of functional groups, novel amino alcohols for promoting $CO_2$ capture can be developed. It has been shown that the placement of functional groups within the amino alcohols affects the performance of the amino alcohols in $CO_2$ capturing. Thus, it has been shown that there is a structure-performance relationship between amino alcohols and $CO_2$ capturing. The data obtained from the speciation and kinetic studies on the interaction of the amino alcohols with $CO_2$ as well as from the evaluation of the performance of the amino alcohols in liquid absorbents provide a basis for structural refinement and optimization of synthetic amino alcohols. It has been shown that certain amino 2-butanol compounds are highly effective reagents for capturing $CO_2$ from gas streams. Desirable characteristics of these amino alcohols include their capacity to absorb a large amount of $CO_2$ per unit mole and to permit the separation of $CO_2$ and the recovery of the absorbing solution with a low amount of heat energy.

Accordingly, the present invention includes a method for removing $CO_2$ from a gas stream comprising contacting the gas stream with a liquid absorbent comprising an amino alcohol of the formula I:

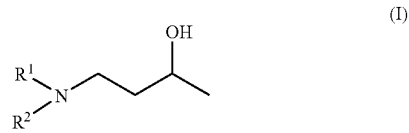

wherein
$R^1$ and $R^2$ are independently selected from H and $C_{1-10}$alkyl, or
$R^1$ and $R^2$ are linked to form a 5 to 12-membered carbocyclic ring system under conditions for absorption of $CO_2$ by the absorbent and thereby, removal of $CO_2$ from the gas stream.

The terms "capture", "capturing", "removal" and "removing" as they apply to $CO_2$ in gas streams are used interchangeably herein. As used herein, these terms refer to processes that provide any measurable reduction in the levels of $CO_2$ in a gas stream.

It is an embodiment of the invention that the amino alcohols of the formula I include those in which $R^1$ and $R^2$ are independently selected from H and $C_{1-6}$alkyl. In a further embodiment of the invention, $R^1$ and $R^2$ in the amino alcohol of the formula I are independently selected from H and $C_{1-4}$alkyl. The term "alkyl" includes straight and branched chain saturated and unsaturated alkyl groups. When unsaturated, the alkyl group may contain 1 to 3 double bonds suitably 1-2 double bonds. Suitably the alkyl group is saturated It is another embodiment of the invention that the amino alcohols of the formula I include those in which $R^1$ and $R^2$ are linked to form a 5 to 10-membered carbocyclic ring system. In a further embodiment of the invention, $R^1$ and $R^2$ are linked to form a 5 or 6-membered carbocyclic ring system. By "carbocyclic ring system" it is meant a saturated or unsaturated carbon-containing ring. When unsaturated, the ring may contain 1 to 3 double bonds suitably 1-2 double bonds. Suitably the ring is saturated.

In an embodiment of the present invention, the amino alcohol is 4-(diethylamino)-2-butanol.

In another embodiment of the invention, the amino alcohol is 4-(piperidino)-2-butanol.

In yet another embodiment of the invention, the amino alcohol is 4-propylamino-2-butanol.

In another embodiment of the invention, the amino alcohol is 4-isopropylamino-2-butanol.

In still another embodiment of the invention, the amino alcohol is 4-(ethyl-methyl-amino)-2-butanol.

It is an embodiment that the liquid absorbent comprises a solvent. Solvents that are suitable for use in the method of the present invention include those that solubilize the amino alcohol and that act as an absorbent for $CO_2$. Examples of suitable solvents include water, alcohol and combinations thereof. In a particular embodiment of the present invention, the solvent is water, suitably deionized water. In another embodiment of the present invention, the solvent is an alcohol, suitably methanol or ethanol.

The term "solubilize" as used herein means that, at the desired concentration, the amino alcohol is substantially soluble in the solvent. The concentration of amino alcohol will generally be in the range of about 1 mol/L to about 10 mol/L, suitably about 3 mol/L to 5 mol/L.

The term "absorbent" as used herein means a liquid in which $CO_2$ is captured or removed from a gas stream.

The gas stream may be any gaseous feed for which it is desirable to remove $CO_2$. In an embodiment, the gaseous feed is combustion exhaust gas from, for example, but not limited to, flue gas streams of coal fired power plants and other power plants, refineries and cement manufacturers. In an embodiment of the invention, the gas stream comprises from about 1% to about 100% by volume $CO_2$, specifically, about 5% to about 30% by volume $CO_2$, more specifically about 9% to about 15% by volume $CO_2$. In a further embodiment of the invention, the gas stream further comprises oxygen.

It is an embodiment of the present invention that the conditions for absorption of $CO_2$ by the absorbent and thereby, removal of $CO_2$ from the gas stream comprise contacting the gas stream with the liquid absorbent at a temperature of about 25° C. to about 90° C. and at a pressure of about 1 to about 120 kPa. It is a more particular embodiment of the present invention that the conditions for absorption of $CO_2$ by the absorbent and thereby, removal of $CO_2$ from the gas stream comprise contacting the gas stream with the liquid absorbent at a temperature of about 40° C. to about 80° C. and at a pressure of about 15 to about 110 kPa.

Optionally, a corrosion inhibitor, an amine aging inhibitor and other additives known in the art may be included in the liquid absorbent.

In an embodiment of the invention, the method further comprises releasing the absorbed $CO_2$ from the absorbent. In an embodiment, the $CO_2$ is released by heating the absorbent, optionally collecting the $CO_2$ and optionally regenerating the absorbent.

The method of the present invention can be carried out in any conventional equipments for the removal of $CO_2$ from gas streams and the detailed procedures are well known to those skilled in the art. The method according to the present invention can be conveniently carried out in any suitable absorbers or absorption columns/towers, such as packed, plate or spray towers. Although certain specific conditions may favour one type of absorber over another, these absorbers are interchangeable to a considerable extent. In addition to the above indicated conventional absorbers, specialized absorption towers are also available to meet specific process requirements. These specialized absorption towers include impingement-plate scrubbers and turbulent contact scrubbers. The absorbers suitable for use with the method of the present invention may also contain other peripheral equipment which may enhance the method of the invention. Such peripheral equipment may include, for example, an inlet gas separator, a treated gas coalescor, a solvent flash tank, a particulate filter and a carbon bed purifier. Depending on the size of the equipment, the inlet gas flow rate will vary. The solvent circulation rate will depend on the amine concentration, the gas flow rate, gas composition, total pressure and the specification of the $CO_2$ gas as would be know to those skilled in the art. The absorbers, strippers and peripheral equipment useful for carrying out the method of the present invention will be known to a person skilled in the art.

The present invention also includes a $CO_2$ absorber, absorption column or absorption tower comprising a liquid absorbent as defined hereinabove.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The following non-limiting examples are illustrative of the invention:

EXPERIMENTAL EXAMPLES

Example 1

Synthesis of the amino alcohol 4-(diethylamino)-2-butanol (1)

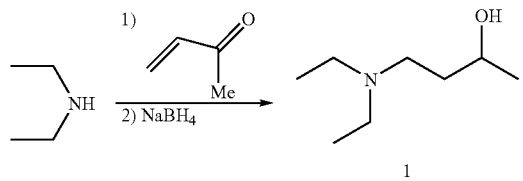

Methyl vinyl ketone (65 mL, 0.71 mol) was added dropwise to ice-water cold neat diethylamine (70 mL, 0.68 mol). After addition was completed in 1 h, the cooling bath was removed and the solution was stirred at room temperature for 3 h. It was diluted with 30 mL of methanol and then cooled in ice water. Sodium boron hydride (26 g, 0.68 mol) was added slowly. Cooling was removed after the addition was completed in 1 h. The stirring was continued at room temperature for 3 h, at which time 30 mL of saturated sodium chloride was added and the mixture was stirred for additional 1 h. The color of the solution turned from green dark into wine red. The formed solid was filtered off through Buchuel funnel, and washed with dichloromethane. The organic layer was separated and the aqueous layer was extracted with dichloromethane (×3). The combined organic layers were dried ($Na_2SO_4$), filtered and concentrated under reduced pressure. A total of four batches of bench reaction products were combined and fractionally distilled using a viqreux column to afford 4-(diethylamino)-2-butanol (260 g, 66%): bp 110° C./50-55 mmHg; IR (neat) 3383 (br.), 2966, 1465 $cm^{-1}$; $^1H$ NMR ($CDCl_3$, 500 MHz) δ3.89 (tq, J=2.1, 6.2 Hz, 1 H), 2.58-2.69 (m, 3H), 2.52 (dt, J=3.8, 13.0 Hz, 1H), 2.31 (sex, J=7.1 Hz, 2 H), 1.48-1.58 (m, 1H), 1.39 (dq, J=3.5, 14.4 Hz, 1H), 1.10 (d, J=6.2 Hz, 3H), 1.00 (t, J=7.2 Hz, 6H).

Example 2

Synthesis of the amino alcohol 4-(morpholino)-2-butanol (2)—Comparative Example

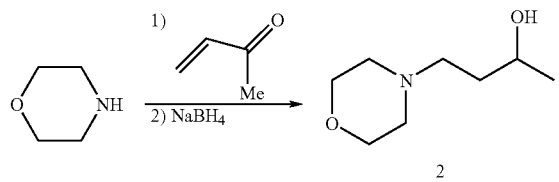

Expansion of the protocol in Example 1 to 4-(morpholino)-2-butanol (2) was accomplished by simply changing the diethyl amine to morpholine. IR $v_{max}$: 3075-3600 $cm^{-1}$; $^1H$ NMR, δ (200 MHz, $CDCl_3$): 0.90 (d, 3H, J=6 Hz), 1.15-1.50 (m, 2H), 2.05-2.45 (m, 6H), 3.42 (t, 4H, J=4.6 Hz), 3.60-3.78 (m, 1H), 5.22-5.36 (br s, 1H).

Example 3

Synthesis of the amino alcohol 4-(isopropylamino)-2-butanol (3)

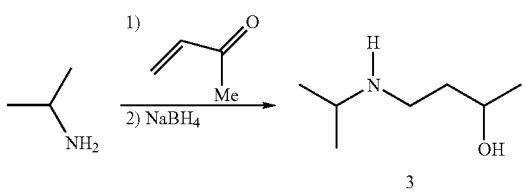

Expansion of the protocol in Example 1 to 4-(isopropylamino)-2-butanol (3) was accomplished by simply changing the diethyl amine to isopropylamine. IR $v_{max}$: 3075-3600 $cm^{-1}$; $^1H$ NMR, δ (200 MHz, $CDCl_3$): 0.85 (d, 6H), 1.04 (d, 3H, J=6.2 Hz), 1.20-1.56 (m, 2H), 2.41-2.94 (m, 3H), 3.75-3.92 (m, 1H) (NH and OH not observed).

Example 4

Synthesis of the amino alcohol 4-(piperidino)-2-butanol (4)

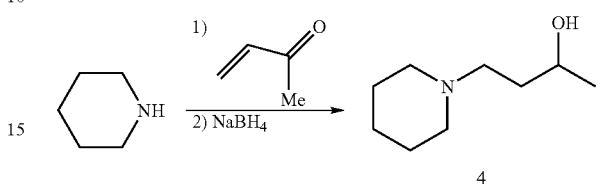

Expansion of the protocol in Example 1 to 4-(piperidino)-2-butanol (4) was accomplished by simply changing the diethyl amine to piperidine. IR $v_{max}$: 3075-3600 $cm^{-1}$; $^1H$ NMR, δ (200 MHz, $CDCl_3$): 1.16 (d, 3H, J=8 Hz), 1.35-1.70 (m, 8H), 2.15-2.38 (m, 2H), 2.45-2.60 (m, 4H), 3.85-4.00 (m, 1H).

Example 5

Synthesis of the amino alcohol 1-dimethylamino-2-methyl-3-pentanol (5) Comparative Example

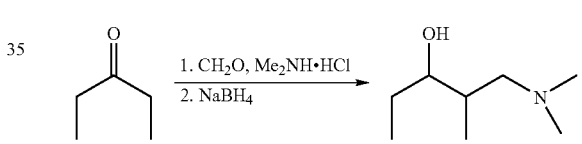

A solution of 3-pentanone (87 g, 1.0 mol), dimethylamine hydrochloride (93.8 g, 1.15 mol), paraformaldehyde (33 g, 1.10 mol) and concentrated hydrochloride acid (1 mL) in anhydrous ethanol (90 mL) was heated at reflux for 1 day. The solvent was removed under reduced pressure. The remaining material was cooled in an ice water bath and treated with an aqueous solution of 40% sodium hydroxide (50 mL), followed by solid sodium hydroxide (30 g). The mixture was stirred for 30 minutes. Subsequently, it was filtered through a short pad of Celite™ and washed with diethyl ether. The mixture was then thoroughly extracted with diethyl ether (×2), and the organic layers were dried with $Na_2SO_4$, filtered and evaporated. The remaining material was purified by fractional distillation under vacuum to give the amino ketone (102.8 g, 72%) as a colorless oil: bp 105° C./52 mmHg; IR (neat) 2966, 2942, 2766, 1707, 1454 $cm^{-1}$; $^1H$ NMR ($CDCl_3$, 500 MHz) δ 2.70-2.80 (m, 1H), 2.54-2.62 (m, 1H), 2.44-2.54 (m, 2H), 2.18 (s, 3H), 2.19 (s, 3H), 2.10-2.16 (m, 1H), 0.80-1.80 (m, 6H); $^{13}C$ NMR ($CDCl_3$, 125 MHz) δ 214.2 (C), 62.8 ($CH_2$), 45.6 ($CH_3$), 44.2 (CH), 34.4 ($CH_2$), 15.0 ($CH_3$), 7.3 ($CH_3$).

Subsequently, the ketone (90 g, 0.63 mol) was diluted with methanol (30 mL) and cooled in an ice water bath. The solution was slowly treated with $NaBH_4$ (29 g, 0.76 mol) over a period of 1 hour. After stirring continuously at 0° C. for another 1 hour and at room temperature for 3 hours, the reaction was quenched by the addition of saturated sodium chloride (30 mL). The reaction mixture was stirred for 30 minutes. Then, it was filtered through a short pad of Celite™ and washed with diethyl ether. The filtrate was dried with $Na_2SO_4$ and NaCl, filtered and evaporated. The remaining material was purified by fractional distillation to give the amino alcohol 1-dimethylamino-2-methyl-3-pentanol (60 g, 66%) as a colorless oil: bp 125° C./98 mmHg; IR (neat) 3408 (br), 1463 cm$^{-1}$; $^1$H NMR (CDCl$_3$, 500 MHz) (two diastereomers) δ 3.38-3.45 (m, 1H), 3.26-3.32 (m, 1H), 2.49 (t, J=11.6 Hz, 1H), 2.42 (t, J=12.1 Hz, 1H), 2.21 (s, 3 H), 2.20 (s, 3H), 2.19 (s, 3H), 2.18 (s, 3H), 2.00-2.12 (m, 2H), 1.60-1.70 (m, 1 H), 1.52-1.60 (m, 1H), 1.34-1.44 (m, 1H), 1.22-1.34 (m, 1H), 1.15 (dt, J=2.3, 6.9 Hz, 1H), 0.96 (dt, J=2.1, 7.3 Hz, 3H), 0.91 (dt, J=2.1, 7.3 Hz, 3H), 0.75 (dd, J=2.0, 6.8 Hz, 3H), 0.68 (dd, J=1.9, 6.8 Hz, 3H), 0.80-0.88 (m, 1H); $^{13}$C NMR (CDCl$_3$, 125 MHz) (two diastereomers) δ 79.9 (CH), 77.1 (CH), 67.8 (CH$_2$), 63.3 (CH$_2$), 45.7 (CH$_3$), 45.3 (CH$_3$), 34.4 (CH), 34.0 (CH), 27.7 (CH$_2$), 24.8 (CH$_2$), 14.8 (CH$_3$), 14.1 (CH$_3$), 10.9 (CH$_3$), 8.9 (CH$_3$).

Example 6

Synthesis of the amino alcohol
1-diethylamino-2-methyl-3-pentanol
(6)—Comparative Example

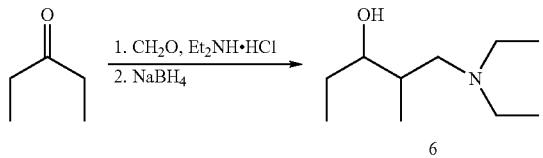

A suspension of 3-pentanone (43 g, 0.5 mol), diethylamine hydrochloride (63 g, 0.58 mol), paraformaldehyde (16.5 g, 0.55 mol) and acetic acid (0.5 mL) in anhydrous ethanol (50 mL) was heated at reflux for 1 day. The solvent was removed under reduced pressure. The solid was cooled in an ice water bath and treated with an aqueous solution of 30% sodium hydroxide (30 mL), followed by solid sodium hydroxide until the pH was >10. The mixture was filtered through a short pad of Celite™ and washed with diethyl ether. The mixture was then thoroughly extracted with diethyl ether (×3), and the organic layers were dried with $Na_2SO_4$, filtered and concentrated. The remaining material was purified by fractional distillation under vacuum to give the amino ketone (50.0 g, 59%) as a colorless oil: bp 100° C./18 mmHg; IR (neat) 1713, 1461 cm$^{-1}$; $^1$H NMR (CDCl$_3$, 500 MHz) δ2.74-2.82 (m, 1H), 2.65-2.73 (m, 1H), 2.38-2.58 (m, 6H), 2.28 (dd, J=6.0, 12.5 Hz, 1H), 1.04 (d, J=7.5 Hz, 3H), 1.02 (dd, J=2.0, 7.5 Hz, 3H), 0.97 (t, J=7.0 Hz, 6H); $^{13}$C NMR (CDCl$_3$, 125 MHz) δ215.1 (C), 57.1 (CH$_2$), 47.2 (CH$_2$), 44.7 (CH), 35.2 (CH$_2$), 15.0 (CH$_3$), 11.7 (CH$_3$), 7.4 (CH$_3$).

To an ice-water cold solution of the ketone (50 g, 0.29 mol) in ethanol (50 mL), NaBH$_4$ (12 g, 0.32 mol) was added slowly over 30 minutes. After stirring continuously at 0° C. for another 1 hour and at room temperature for 2 hours, the reaction was quenched by the addition of water. The reaction mixture was stirred overnight. Then, it was filtered through a short pad of Celite™ and washed with diethyl ether. The mixture was thoroughly extracted with diethyl ether (×3) and the organic extracts were dried with $Na_2SO_4$, filtered and concentrated. The remaining material was purified by fractional distillation to give the amino alcohol 1-diethylamino-2-methyl-3-pentanol (32.0 g, 64%) as a colorless oil: bp 105° C./15 mmHg; IR (neat) 3413, 3213, 2955, 2931, 1461, 1378, 1190, 973 cm$^{-1}$; $^1$H NMR (CDCl$_3$, 500 MHz) (two diastereomers) δ 3.42-3.48 (m, 1H), 3.28-3.34 (m, 1H), 2.56-2.74 (m, 5H), 2.24-2.48 (m, 7H), 2.10-2.18 (m, 1 H), 1.63-1.70 (m, 1H), 1.53-1.62 (m, 1H), 1.37-1.46 (m, 1H), 1.24-1.37 (m, 2 H), 0.90-1.06 (m, 18H), 0.76 (d, J=7.5 Hz, 3H), 0.70 (d, J=6.5 Hz, 3H); $^{13}$C NMR (CDCl$_3$, 125 MHz) (two diastereomers) δ 80.0 (CH), 77.9 (CH), 62.3 (CH$_2$), 57.7 (CH$_2$), 47.3 (CH$_2$), 47.1 (CH$_2$), 34.5 (CH), 34.4 (CH), 28.2 (CH$_2$), 24.9 (CH$_2$), 15.1 (CH$_3$), 15.0 (CH$_3$), 11.6 (CH$_3$), 11.5 (CH$_3$), 11.3 (CH$_3$), 9.40 (CH$_3$).

Example 7

Synthesis of the amino alcohol
1-dimethylamino-4,4-dimethyl-3-pentanol
(7)—Comparative Example

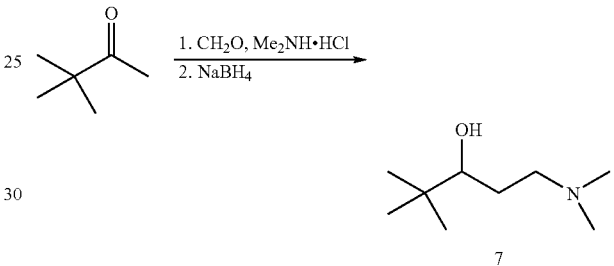

Expansion of the protocol in Example 5 to 1-dimethylamino-4,4-dimethyl-3-pentanol (7) was accomplished by simply changing the 3-pentanone to pinacolone. A suspension of pinacolone (50 g, 0.5 mol), dimethylamine hydrochloride (46.9 g, 0.58 mol), paraformaldehyde (16.5 g, 0.55 mol) and acetic acid (0.5 mL) in anhydrous ethanol (50 mL) was heated at reflux for 1 day. The solvent was removed under reduced pressure during which time the reaction mixture became solidified. The solid was cooled in an ice water bath and treated with an aqueous solution of 30% sodium hydroxide (30 mL), followed by solid sodium hydroxide until the pH was >10. The mixture was filtered through a short pad of Celite™ and washed with diethyl ether. The mixture was then thoroughly extracted with diethyl ether (×3), and the organic layers were washed with brine, dried with $Na_2SO_4$, filtered and concentrated. The remaining material was purified by fractional distillation under vacuum to give the amino ketone (68.0 g, 87%) as a colorless oil: bp 90° C./15 mmHg; IR (neat) 2966, 1701, 1460, 1366 cm$^{-1}$; $^1$H NMR (CDCl$_3$, 500 MHz) δ 2.70 (t, J=6.7 Hz, 2H), 2.58 (t, J=7.3 Hz, 2H), 2.26 (s, 6H), 1.14 (s, 9H); $^{13}$C NMR (CDCl$_3$, 125 MHz) δ 214.2 (C), 53.9 (CH$_2$), 45.2 (CH$_3$), 43.9 (C), 34.6 (CH$_2$), 26.0 (CH$_3$).

To an ice-water cold solution of the ketone (132 g, 0.84 mol) in ethanol (70 mL), NaBH$_4$ (35 g, 0.93 mol) was slowly added over 1 hour. After stirring continuously at 0° C. for another 2 hours and at room temperature for 2 hours, the reaction was quenched by the addition of saturated sodium chloride (30 mL). The reaction mixture was stirred for 30 minutes. Then, it was filtered through a short pad of Celite™ and washed with diethyl ether. The mixture was thoroughly extracted with diethyl ether (×3) and the organic extracts were dried with $Na_2SO_4$, filtered and concentrated. The remaining material was purified by fractional distillation to give the amino alcohol 1-dimethylamino-4,4-dimethyl-3-pentanol (87 g, 55%) as a colorless oil: bp 120° C./15 mmHg; IR (neat) 3260 (br), 2954, 1460 cm$^{-1}$; $^1$H NMR (CDCl$_3$, 500 MHz) δ 3.38 (dd, J=2.5, 10.5 Hz, 1H), 2.63 (dt, J=2.4, 12.2 Hz, 1H), 2.42 (dt, J=2.9, 12.0 Hz, 1H), 2.22 (s, 6H), 1.46-1.57 (m, 1H), 1.36-1.44 (m, 1H), 0.85 (s, 9H); $^{13}$C NMR (CDCl$_3$, 125 MHz) δ 81.4 (CH), 59.4 (CH$_2$), 44.9 (CH$_3$), 34.3 (C), 26.3 (CH$_2$), 25.4 (CH$_3$).

Example 8

Synthesis of the amino alcohol 4-propylamino-2-butanol (8)

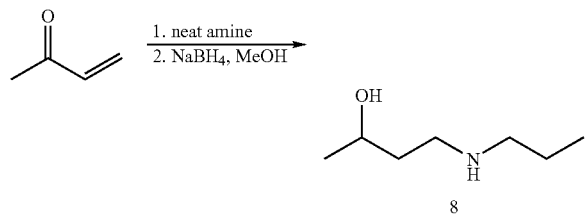

8

Expansion of the protocol in Example 1 to 4-propylamino-2-butanol (8) was accomplished by simply changing the diethyl amine to propylamine. To an ice-water cold solution of neat propylamine (82 mL, 1.0 mol), methyl vinyl ketone was added dropwise (82 mL, 1.0 mol) over 2 hours. After the addition was completed, the reaction mixture was stirred at the same temperature for 1 hour, and at room temperature for 2 hours. It was then diluted with 50 mL of methanol and cooled in an ice-water bath. Sodium borohydride (45 g, 1.2 mol) was added portionwise. After the addition was completed in 2 hours, the ice-water bath was removed. The reaction mixture was continuously stirred at room temperature for 3 hours, at which time 30 mL of saturated sodium chloride was added, followed by another 30 minutes of stirring. The solid formed was filtered through a short pad of Celite™ and washed with dichloromethane. The filtrate was concentrated under reduced pressure. The concentrated solution was diluted with dichloromethane, dried with Na$_2$SO$_4$, filtered and concentrated under reduced pressure. The remaining material was purified by fractional distillation to give the amino alcohol 4-propylamino-2-butanol (35.7 g, 27%): bp 105° C./12 mmHg; IR (neat) 3282 (br.), 2962, 1462, 1125 cm$^{-1}$; $^1$H NMR (CDCl$_3$, 500 MHz) δ 3.91 (dtd, J=2.5, 6.5, 15.0 Hz, 1H), 2.92 (ddd, J=4.0, 5.0, 12.5 Hz, 1H), 2.69 (ddd, J=3.5, 11.0, 12.0 Hz, 1H), 2.50-2.60 (m, 1H), 2.40-2.48 (m, 1H), 1.38-1.54 (m, 4H), 1.09 (d, J=6.5 Hz, 3H), 0.85 (t, J=7.5 Hz, 3H); $^{13}$C NMR (CDCl$_3$, 125 MHz) δ69.9 (CH), 51.7 (CH$_2$), 49.1 (CH$_2$), 36.9 (CH$_2$), 23.8 (CH$_3$), 23.2 (CH$_2$), 12.0 (CH$_3$).

Example 9

Synthesis of the amino alcohol 4-(ethyl-methyl-amino)-2-butanol (9)

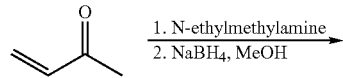

-continued

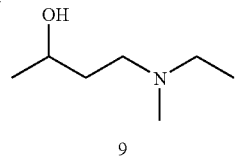

9

Expansion of the protocol in Example 1 to 4-(ethyl-methyl-amino)-2-butanol (9) was accomplished by simply changing the diethyl amine to N-ethylmethylamine. To an ice-water cold solution of neat N-ethylmethylamine (50 g, 0.85 mol), freshly distilled methyl vinyl ketone (76 mL, 0.93 mol) was added. After the addition was completed in 1 hour, cooling was removed and the reaction mixture was stirred at room temperature for 3 hours. It was then diluted with 50 mL of methanol and cooled in an ice-water bath. Sodium boron hydride (18 g, 0.46 mol) was added portionwise. After the addition was completed in 1 hour, the ice-water bath was removed. The reaction mixture was continuously stirred at room temperature for 3 hours, at which time 20 mL of saturated sodium chloride was added, followed by another 30 minutes of stirring. The solid formed was filtered through a short pad of Celite™ and washed with dichloromethane. The filtrate was concentrated under reduced pressure. The concentrated solution was diluted with diethyl ether, dried with Na$_2$SO$_4$, filtered and concentrated under reduced pressure. The remaining material was purified by fractional distillation to give the amino alcohol 4-(ethyl-methyl-amino)-2-butanol (71.8 g, 65%): bp 81° C./12 mmHg; IR (neat) 3282 (br.), 2962, 1462, 1125 cm$^{-1}$; $^1$H NMR (CDCl$_3$, 500 MHz) δ 3.85 (tq, J=2.5, 6.5 Hz, 1H), 2.59 (ddd, J=4.0, 11.0, 12.5 Hz, 1H), 2.45 (ddd, J=7.0, 12.0, 14.5 Hz, 1H), 2.40 (dt, J=4.5, 12.0 Hz, 1H), 2.25 (dq, J=7.0, 12.5 Hz, 1H), 2.15 (s, 3H), 1.46-1.55 (m, 1H), 1.35-1.42 (m, 1H), 1.06 (d, J=6.5 Hz, 3H), 0.98 (t, J=7.0 Hz, 3H); $^{13}$C NMR (CDCl$_3$, 125 MHz) δ 69.9 (CH), 57.0 (CH$_2$), 51.7 (CH$_2$), 41.5 (CH$_3$), 34.1 (CH$_2$), 23.7 (CH$_3$), 12.4 (CH$_3$).

Example 10

Evaluation of the Performance of Amino Alcohols (1) to (9)

(i) Apparatus:

As can be seen in FIG. 1, the experimental apparatus consists of a saturation cell (to control the concentration of solution) connected to a reactor (Lee, J. I., Otto, F. D. and Mather, A. E., "Equilibrium Between Carbon Dioxide and Aqueous Monoethanolamine Solutions", J. Appl. Chem. Biotechnol, Vol. 26, pp. 541-549, 1976). Both the cell and the reactor were immersed in a constant temperature water bath (Cole-Parmer) maintained at indicated temperatures with an accuracy of ±0.01° C. stability by using a temperature controller (Cole-Parmer Polystat Immersion Circulators, which operates within the temperature range of −20 to 200° C.). The temperature in the system was measured by a thermister (Cole-Parmer with an accuracy of ±0.03° C.).

(ii) Materials:

The solvents evaluated were MEA at 99+% purity (obtained from Fisher scientific) and the amino alcohols samples (1) to (9) described in Examples 1 to 9, respectively. Aqueous solutions of these amines/amino alcohols were prepared using deionized water to achieve a concentration of 3 mol/L of solution. Nitrogen and $CO_2$ (obtained from Praxair Inc.)

with purities of 99.9% were also used in the evaluation. All the materials were used without further purification.

(iii) General Procedure:

The solvent was fed into the system (FIG. 1) and the gases were introduced to the process through flow meters (Cole-Parmer ±0.15%/° C. full scale accuracy) at the desired partial pressure. A gas mixture saturated with moisture content in the saturation cell was used to maintain the solution concentration. The wetted gas mixture was then bubbled through the amine test solution and eventually exhausted. The gas was sent to the condenser before being vented to the fume hood. The process was operated under atmospheric pressure.

To ensure that equilibrium was reached, the system was kept in operation for 8-10 hours. Then, the liquid sample was taken to analyze for $CO_2$ loading. The presence of $CO_2$ was evaluated many times, for which the sample was taken every one or two hours until the $CO_2$ loading was constant or until two consecutive readings show only a slight difference ($\leqq \pm 0.05$ difference). The operating conditions for this evaluation are shown in Table 1.

The $CO_2$ loading for each liquid sample was determined as described hereinbelow. The sample was first withdrawn from the cell using a 2 or 3 mL pipette. Then, excess 1.0 N HCl acid was added to the 2-3 mL sample, and all of the $CO_2$ evolved was collected in a gas burette for measurement. The amount of $CO_2$ in g-mol that was evolved was measured. The sample solution concentration and the $CO_2$ loading were determined by using the procedure outlined by the Association of Official Analytical Chemists (Horwitz, W., Association of Official Analytical Chemists (AOAC) Methods, $12^{th}$ Edition, George Banta, 1975). From these results, the ratio of $CO_2$ to amino alcohol in the liquid phase, as given in Table 2, was calculated.

(iv) Results and Discussions

The experimental results of the synthetic amino alcohols (1) to (9) as compared to MEA at various conditions are shown in Tables 2 and 3, as well as in FIGS. 2 to 5, both in terms of $CO_2$ absorption capacity and the ease of regeneration. From the experimental results, it can be seen that at low temperatures, the synthetic amino alcohols (1), (3), (4), (8) and (9) provide a much higher $CO_2$ absorption capacity than MEA. As shown in Table 3, the absorption capacity differences at 40° C. and 60° C. and 15 kPa and 100 kPa compared with MEA are 30 to 39% higher for synthetic amino alcohol (1), 33 to 42% higher for synthetic amino alcohol (3), 21 to 37% higher for synthetic amino alcohol (4), 10 to 23% higher for synthetic amino alcohol (8), and 14 to 43% higher for synthetic amino alcohol (9). Furthermore, at a higher temperature 80° C., the synthetic amino alcohols (1) and (4) have a slightly higher $CO_2$ absorption capacity than MEA (ranging from 15 to 24% and 25 to 31% higher for synthetic amino alcohols (1) and (4), respectively) whereas the synthetic amino alcohols (8) and (9) have a slightly lower $CO_2$ absorption capacity than MEA (ranging from −3% to 5% and −70 to −40% lower for synthetic amino alcohols (8) and (9), respectively). However, synthetic amino alcohol (3) has a higher $CO_2$ absorption capacity than MEA at this higher temperature, ranging from 33 to 72% higher. This shows a higher cyclic capacity of the synthetic amino alcohols as compared with MEA and indicates an advantage from the viewpoint of energy efficiency in the regeneration of the amines. Compared with conventional amines, one of the most important features of synthetic amino alcohols (1), (3), (4), (8) and (9) is the high absorption capacity that arises from the unique relative positions of the amino and hydroxyl groups in the molecule. This is a desired characteristic. However, it can be seen from Table 2 and FIG. 2 that there is a phase separation at high temperatures for synthetic amino alcohol (1), (4), (5) and (7). Despite this anomaly, the results show a cyclic capacity that is by far greater than that for aqueous MEA.

As shown in Table 2, the amino alcohols of Examples 2, 5, 6 and 7 did not function to capture $CO_2$, illustrating the unexpected and exceptional properties of amino alcohols (1), (3), (4), (8) and (9).

While the present invention has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

| Experimental operating conditions for solubility study. | |
|---|---|
| Solution Concentration (kmol/m³) | 3 |
| Partial Pressure of $CO_2$ (kPa) | 15 and 100 |
| Temperature (° C.) | 40, 60 and 80 |

TABLE 2

Solubilities of MEA and the synthetic amino alcohols (1) to (9) at
conditions close to the absorption and stripping columns.

| Sample | Condition | Concentration of Sample (mole/L) | $CO_2$ loading at 25° C. (mole $CO_2$/mole amine) | Comment |
|---|---|---|---|---|
| MEA 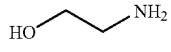 | 15 kPa $CO_2$ at 40° C. | 2.97 | 0.609 | |
| | 100 kPa $CO_2$ at 40° C. | 2.97 | 0.693 | |
| | 15 kPa $CO_2$ at 60° C. | 2.99 | 0.490 | |
| | 100 kPa $CO_2$ at 60° C. | 2.97 | 0.621 | |
| | 15 kPa $CO_2$ at 80° C. | 3.00 | 0.379 | |
| | 100 kPa $CO_2$ at 80° C. | 2.97 | 0.586 | |

TABLE 2-continued

Solubilities of MEA and the synthetic amino alcohols (1) to (9) at conditions close to the absorption and stripping columns.

| Sample | Condition | Concentration of Sample (mole/L) | $CO_2$ loading at 25° C. (mole $CO_2$/mole amine) | Comment |
|---|---|---|---|---|
| 1 | 15 kPa $CO_2$ at 40° C. | 2.78 | 0.826 | Phase separation at high temperature |
| | 100 kPa $CO_2$ at 40° C. | 2.99 | 0.962 | |
| | 15 kPa $CO_2$ at 60° C. | (lower part) 1.84 | 0.637 | |
| | | (upper part) 4.80 | 0.013 | |
| | 100 kPa $CO_2$ at 60° C. | (lower part) 2.72 | 0.840 | |
| | | (upper part) 5.00 | 0.016 | |
| | 15 kPa $CO_2$ at 80° C. | (lower part) 1.22 | 0.437 | |
| | | (upper part) 4.87 | 0.006 | |
| | 100 kPa $CO_2$ at 80° C. | (lower part) 1.73 | 0.724 | |
| | | (upper part) 5.03 | 0.008 | |
| 2 | 15 kPa $CO_2$ at 40° C. | 4.80 | 0.000 | No absorption |
| | 15 kPa $CO_2$ at 80° C. | 3.37 | 0.000 | |
| 3 | 15 kPa $CO_2$ at 40° C. | 2.72 | 0.836 | Solid at room temperature |
| | 100 kPa $CO_2$ at 40° C. | 2.83 | 0.919 | |
| | 15 kPa $CO_2$ at 60° C. | 3.00 | 0.698 | |
| | 100 kPa $CO_2$ at 60° C. | N/A | N/A | |
| | 15 kPa $CO_2$ at 80° C. | 2.03 | 0.650 | |
| | 100 kPa $CO_2$ at 80° C. | 2.19 | 0.781 | |
| 4 | 15 kPa $CO_2$ at 40° C. | (lower part) 2.50 | 0.747 | Phase Separation |
| | | (upper part) 4.83 | 0.020 | |
| | 100 kPa $CO_2$ at 40° C. | 2.97 | 0.947 | |
| | 15 kPa $CO_2$ at 60° C. | (lower part) 1.43 | 0.593 | |
| | | (upper part) 4.67 | 0.015 | |
| | 100 kPa $CO_2$ at 60° C. | (lower part) 2.40 | 0.807 | |
| | | (upper part) 5.00 | 0.019 | |
| | 15 kPa $CO_2$ at 80° C. | (lower part) 0.7 | 0.497 | |
| | | (upper part) 4.80 | 0.040 | |
| | 100 kPa $CO_2$ at 80° C. | (lower part) 1.07 | 0.735 | |
| | | (upper part) 4.90 | 0.089 | |
| 5 | 15 kPa $CO_2$ at 25° C. | (lower part) 2.37 | 0.398 | Does not dissolve in water |
| | | (upper part) 4.17 | 0.033 | |
| | 100 kPa $CO_2$ at 25° C. | 2.97 | 0.703 | Phase separation at high temperature |
| | 15 kPa $CO_2$ at 40° C. | (lower part) 1.90 | 0.243 | |
| | | (upper part) 3.83 | 0.021 | |
| | 100 kPa $CO_2$ at 40° C. | (lower part) 2.50 | 0.566 | |
| | | (upper part) 4.23 | 0.037 | |
| | 15 kPa $CO_2$ at 55° C. | (lower part) 1.07 | 0.223 | |
| | | (upper part) 5.00 | 0.011 | |
| | 100 kPa $CO_2$ at 55° C. | (lower part) 1.03 | 0.545 | |
| | | (upper part) 5.27 | 0.013 | |
| 6 | 15 kPa $CO_2$ at 40° C. | 2.97 | 0.000 | No absorption |
| | 100 kPa $CO_2$ at 40° C. | 2.93 | 0.000 | |

TABLE 2-continued

Solubilities of MEA and the synthetic amino alcohols (1) to (9) at conditions close to the absorption and stripping columns.

| Sample | Condition | Concentration of Sample (mole/L) | CO$_2$ loading at 25° C. (mole CO$_2$/mole amine) | Comment |
|---|---|---|---|---|
| 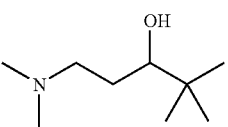 7 | 15 kPa CO$_2$ at 25° C. 100 kPa CO$_2$ at 25° C. 15 kPa CO$_2$ at 40° C. 100 kPa CO$_2$ at 40° C. 100 kPa CO$_2$ at 40° C. 15 kPa CO$_2$ at 55° C. 100 kPa CO$_2$ at 55° C. | 2.83 2.90 2.87 2.93 (lower part) 0.97 (upper part) 4.5 2.87 | 0.361 0.772 0.195 0.403 0.116 0.000 0.264 | Does not dissolve in water Phase separation at high temperature |
| 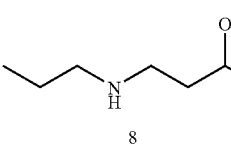 8 | 15 kPa CO$_2$ at 40° C. 100 kPa CO$_2$ at 40° C. 15 kPa CO$_2$ at 60° C. 100 kPa CO$_2$ at 60° C. 15 kPa CO$_2$ at 80° C. 100 kPa CO$_2$ at 80° C. | 2.91 3.00 2.92 2.96 2.31 2.89 | 0.681 0.849 0.541 0.729 0.396 0.565 | |
| 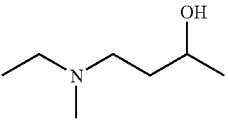 9 | 15 kPa CO$_2$ at 40° C. 100 kPa CO$_2$ at 40° C. 15 kPa CO$_2$ at 60° C. 100 kPa CO$_2$ at 60° C. 15 kPa CO$_2$ at 80° C. 100 kPa CO$_2$ at 80° C. | 2.91 2.97 2.91 2.81 2.79 2.88 | 0.695 0.948 0.323 0.889 0.115 0.352 | |

TABLE 3

Absorption capacity difference of synthetic amino alcohols compared with MEA.

| Sample | Condition | CO$_2$ loading at 25° C. (mole CO$_2$/mole amine) | Absorption Capacity Difference (mole CO$_2$/mole amine) | % Difference |
|---|---|---|---|---|
| MEA 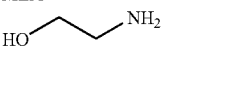 | 15 kPa CO$_2$ at 40° C. 100 kPa CO$_2$ at 40° C. 15 kPa CO$_2$ at 60° C. 100 kPa CO$_2$ at 60° C. 15 kPa CO$_2$ at 80° C. 100 kPa CO$_2$ at 80° C. | 0.609 0.693 0.490 0.621 0.379 0.586 | N/A | N/A |
| 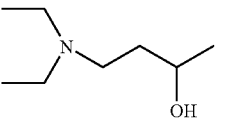 1 | 15 kPa CO$_2$ at 40° C. 100 kPa CO$_2$ at 40° C. 15 kPa CO$_2$ at 60° C. 100 kPa CO$_2$ at 60° C. 15 kPa CO$_2$ at 80° C. 100 kPa CO$_2$ at 80° C. | 0.826 0.962 0.637 0.840 0.437 0.724 | 0.217 0.269 0.147 0.279 0.058 0.138 | 35.63 38.82 30.00 35.27 15.30 23.55 |
| 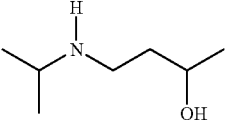 3 | 15 kPa CO$_2$ at 40° C. 100 kPa CO$_2$ at 40° C. 15 kPa CO$_2$ at 60° C. 100 kPa CO$_2$ at 60° C. 15 kPa CO$_2$ at 80° C. 100 kPa CO$_2$ at 80° C. | 0.836 0.919 0.698 N/A 0.650 0.781 | 0.227 0.226 0.208 N/A 0.271 0.195 | 37.27 32.61 42.45 N/A 71.50 33.28 |

TABLE 3-continued

Absorption capacity difference of synthetic amino alcohols compared with MEA.

| Sample | Condition | $CO_2$ loading at 25° C. (mole $CO_2$/mole amine) | Absorption Capacity Difference (mole $CO_2$/mole amine) | % Difference |
|---|---|---|---|---|
| 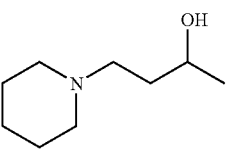 4 | 15 kPa $CO_2$ at 40° C. | 0.747 | 0.138 | 22.66 |
| | 100 kPa $CO_2$ at 40° C. | 0.947 | 0.254 | 36.65 |
| | 15 kPa $CO_2$ at 60° C. | 0.593 | 0.103 | 21.02 |
| | 100 kPa $CO_2$ at 60° C. | 0.807 | 0.246 | 29.95 |
| | 15 kPa $CO_2$ at 80° C. | 0.497 | 0.118 | 31.13 |
| | 100 kPa $CO_2$ at 80° C. | 0.735 | 0.149 | 25.43 |
| 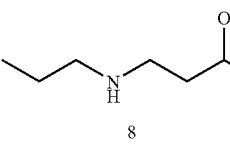 8 | 15 kPa $CO_2$ at 40° C. | 0.681 | 0.072 | 11.82 |
| | 100 kPa $CO_2$ at 40° C. | 0.849 | 0.156 | 22.51 |
| | 15 kPa $CO_2$ at 60° C. | 0.541 | 0.051 | 10.41 |
| | 100 kPa $CO_2$ at 60° C. | 0.729 | 0.108 | 17.39 |
| | 15 kPa $CO_2$ at 80° C. | 0.396 | 0.017 | 4.49 |
| | 100 kPa $CO_2$ at 80° C. | 0.565 | −0.021 | −3.58 |
| 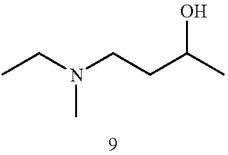 9 | 15 kPa $CO_2$ at 40° C. | 0.695 | 0.086 | 14.12 |
| | 100 kPa $CO_2$ at 40° C. | 0.948 | 0.255 | 36.80 |
| | 15 kPa $CO_2$ at 60° C. | 0.323 | −0.167 | −34.08 |
| | 100 kPa $CO_2$ at 60° C. | 0.889 | 0.268 | 43.16 |
| | 15 kPa $CO_2$ at 80° C. | 0.115 | −0.264 | −69.66 |
| | 100 kPa $CO_2$ at 80° C. | 0.352 | −0.234 | −39.93 |

*negative value (−) means the Absorption is lower than MEA.

We claim:

1. A method for removing carbon dioxide ($CO_2$) from a gas stream comprising contacting the gas stream with a liquid absorbent consisting essentially of an aqueous solvent and an amino alcohol of the formula I:

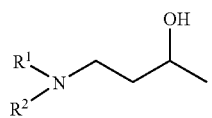

wherein $R^1$ and $R^2$ are independently selected from H and $C_{1-10}$alkyl, or $R^1$ and $R^2$ are linked to form a 5 to 12-membered carbocyclic ring system under conditions for absorption of $CO_2$ by the absorbent and thereby, removal of $CO_2$ from the gas stream.

2. The method according to claim 1, wherein $R^1$ and $R^2$ are independently selected from H and $C_{1-6}$alkyl.

3. The method according to claim 2, wherein $R^1$ and $R^2$ are independently selected from H and $C_{1-4}$alkyl.

4. The method according to claim 1, wherein $R^1$ and $R^2$ are linked to form a 5 to 10-membered carbocyclic ring system.

5. The method according to claim 4, wherein $R^1$ and $R^2$ are linked to form a 5 or 6-membered carbocyclic ring system.

6. The method according to claim 1, wherein the amino alcohol is 4-(diethylamino)-2-butanol.

7. The method according to claim 1, wherein the amino alcohol is 4-(isopropylamino)-2-butanol.

8. The method according to claim 1, wherein the amino alcohol is 4-(piperidino)-2-butanol.

9. The method according to claim 1, wherein the amino alcohol is 4-propylamino-2-butanol.

10. The method according to claim 1, wherein the amino alcohol is 4-(ethyl-methyl-amino)-2-butanol.

11. The method according claim 1, wherein the aqueous solvent solubilizes the amino alcohol and is an absorbent for $CO_2$.

12. The method according to claim 1, wherein the aqueous solvent is selected from water, a short-chain alcohol and combinations thereof.

13. The method according to claim 12, wherein the aqueous solvent is deionized water.

14. The method according to claim 12, wherein the aqueous solvent is methanol or ethanol.

15. The method according to claim 1, wherein the conditions for absorption of $CO_2$ by the liquid absorbent and thereby, removal of $CO_2$ from the gas stream comprise contacting the gas stream with the liquid absorbent at a temperature of about 25° C. to about 90° C. and at a pressure of about 1 to about 120 kPa.

16. The method according to claim 15, wherein the conditions for absorption of $CO_2$ by the liquid absorbent and thereby, removal of $CO_2$ from the gas stream comprise contacting the gas stream with the liquid absorbent at a temperature of about 40° C. to about 80° C. and at a pressure of about 15 to about 110 kPa.

17. The method according to claim 1, wherein the gas stream is a combustion exhaust gas.

18. The method according to claim 17, wherein the combustion exhaust gas is from gas streams of power plants, refineries or cement manufacturers.

19. The method according to claim 1, wherein the gas stream comprises from about 1% to about 100% by volume $CO_2$.

20. The method according to claim 19, wherein the gas stream comprises from about 9% to about 15% by volume $CO_2$.

21. The method according to claim 17, wherein the gas stream further comprises oxygen.

22. The method according to claim 1, further comprising releasing the absorbed $CO_2$ from the liquid absorbent.

23. The method according to claim 22, wherein the $CO_2$ is released by heating the liquid absorbent, optionally collecting the $CO_2$ and optionally regenerating the liquid absorbent.

24. A $CO_2$ absorber, absorption column or absorption tower comprising a liquid absorbent as defined in claim 1.

* * * * *